(12) United States Patent
Rubenstein et al.

(10) Patent No.: US 8,380,010 B2
(45) Date of Patent: Feb. 19, 2013

(54) CONTENT AWARE RESIZING OF IMAGES AND VIDEOS

(75) Inventors: Michael Rubenstein, Cambridge, MA (US); Arial Shamir, Jerusalem (IL); Shmuel Avidan, Brookline, MA (US); Matthew E. Brand, Newtonville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 349 days.

(21) Appl. No.: 12/671,531

(22) PCT Filed: Nov. 12, 2008

(86) PCT No.: PCT/US2008/083252
§ 371 (c)(1),
(2), (4) Date: Feb. 1, 2010

(87) PCT Pub. No.: WO2009/070449
PCT Pub. Date: Jun. 4, 2009

(65) Prior Publication Data
US 2011/0211771 A1  Sep. 1, 2011

Related U.S. Application Data

(60) Provisional application No. 60/991,361, filed on Nov. 30, 2007.

(51) Int. Cl.
*G06K 9/32* (2006.01)
*G06K 15/02* (2006.01)
(52) U.S. Cl. ........................ 382/299; 358/1.2
(58) Field of Classification Search ................. 382/173, 382/240, 298–299, 305, 312; 358/1.2, 528; 345/440, 660, 664, 665
See application file for complete search history.

(56) References Cited

U.S. PATENT DOCUMENTS

| | | | |
|---|---|---|---|
| 7,308,198 B1 * | 12/2007 | Chudak et al. | 398/58 |
| 7,474,791 B2 * | 1/2009 | Berkner et al. | 382/232 |
| 7,602,398 B2 * | 10/2009 | Zhou et al. | 345/582 |
| 7,778,491 B2 * | 8/2010 | Steedly et al. | 382/294 |
| 7,800,627 B2 * | 9/2010 | Zhou et al. | 345/582 |
| 7,822,274 B2 * | 10/2010 | Sinop et al. | 382/173 |

* cited by examiner

*Primary Examiner* — Kanjibhai Patel
(74) *Attorney, Agent, or Firm* — Gene Vinokur; Dirk Brinkman

(57) ABSTRACT

A method resizes input images by first constructing a grid graph. The grid graph includes one node for each pixel in the input image, and adjacent nodes in the grid graph are connected by arcs. Each arc is directed and has an associated cost. A cut is applied to the arcs of the grid graph using a cost function. A seam of pixels is determined from the cut so that coordinates of the pixels in the seam enforce monotonicity and connectivity constraints. Then, the input image is resized according to the seam to produce an output image while minimizing a change of energy in the output image when compared with the input image.

17 Claims, 14 Drawing Sheets

111

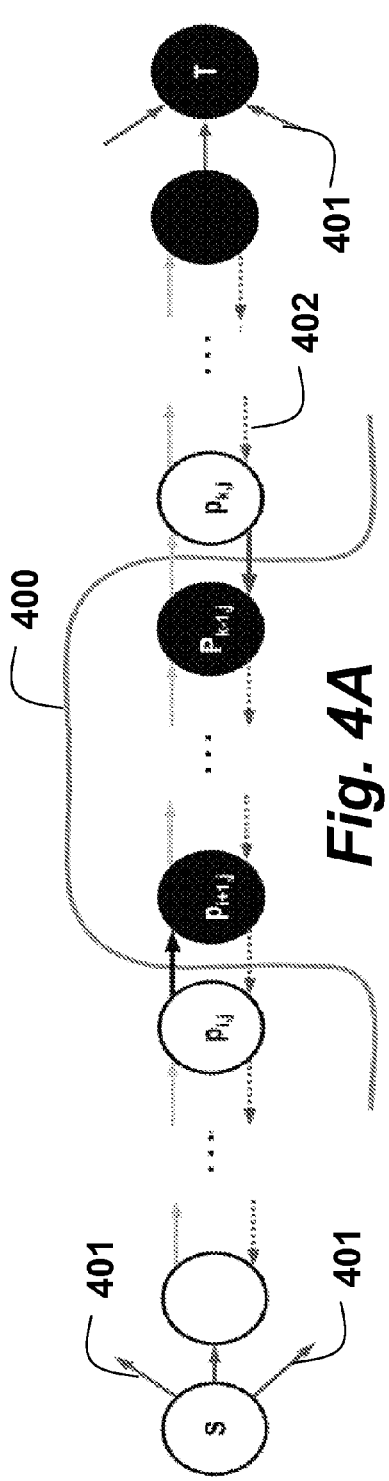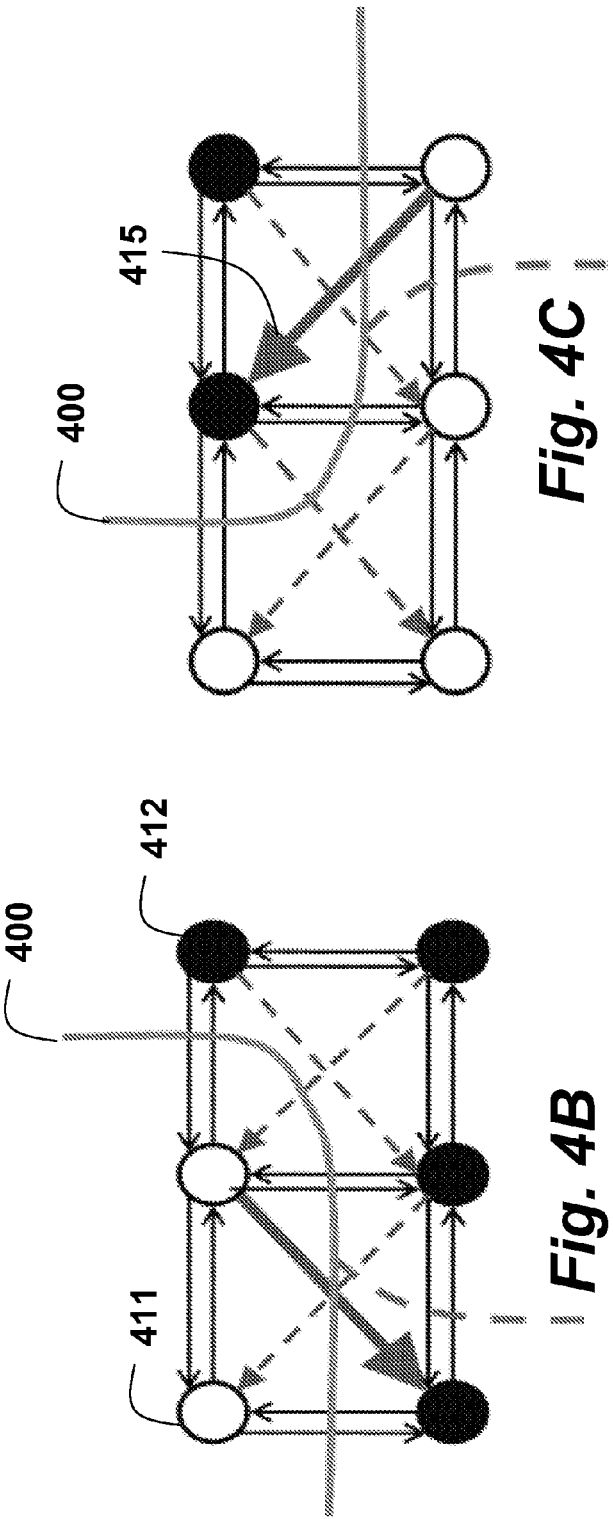
Fig. 4A
Fig. 4B
Fig. 4C

CONTENT AWARE RESIZING OF IMAGES AND VIDEOS

RELATED APPLICATIONS

This Application claims priority to U.S. Provisional Application Ser. No. 60/990,964, "Retargeting Images Using Graph Cuts," filed Nov. 29, 2007, and U.S. Provisional Application Ser. No. 60/991,361, "Seam Carving for Content-Aware Video Resizing," filed Nov. 30, 2007, both incorporated by reference in their entirety.

FIELD OF THE INVENTION

This invention relates generally to image processing, and more particularly to resizing images and videos.

BACKGROUND OF THE INVENTION

Seam carving is an effective technique for content aware image resizing. Images may need to be resized for display devices with different aspect ratios or different resolutions. In a similar manner, it should be possible to resize videos for televisions, computer terminals, cellular telephones, and other hand-held display devices by either changing any combination of the aspect ratio, resolution and time span of the video.

A naïve extension of seam carving to videos is to treat each video frame as an image and resize each the frame independently of other frames. However, this causes jittery artifacts due to a lack of temporal coherency.

Conventional seam carving also has other limitations. In images where salient spatial structures appear, seam carving can generate annoying artifacts. These would be magnified in videos, where spatial artifacts can be amplified and augmented by temporal artifacts. In fact, because of the way human perception operates, temporal artifacts may even be more disturbing in videos, as the human eyes are highly sensitive to motion.

A number of methods and techniques are known for image and video resizing. Attention models, based on human spatio-temporal perception, have been used to detect Regions of Interest (ROI) in an image and a video. The ROI are then used to define display paths to be used on devices in which the display size is smaller than the video (or image) size. The least important content of the video is cropped, leaving the important features in a larger scale, essentially causing a zoom-in-like effect.

Virtual camera motion or pseudo zoom-in/out effects have been used to present the content in a visually pleasing manner. Similarly, both cropping and scaling have been used with virtual camera motion to mimic the process of adapting wide screen feature films and DVDs to the standard television formats. One system minimizes information loss based on objects in the image, and detected objects, e.g., faces. Cropping, however, discards considerable amounts of information, and might be problematic, for instance, if important features are located near the edges of the video frames, which are common in wide or over-the-shoulder shots as is typically done for filming dialogues between two actors.

An alternative approach segments the image into background and foreground layers, and then scales each layer independently. Then, the layers are recombined to produce a resized image. That technique relies crucially on the quality of the segmentation, which is a difficult and complicated task in itself.

Another method is object-based. The input video is segmented into objects and activities. Then, a short video synopsis can be composed of the segmented objects. That method only deals with retiming the video, and does not change its spatial extent.

Another method uses non-uniform global warping and concentrates on defining an effective saliency map for the video that comprises spatial edges, face detection and motion detection.

An alternative approach maps 2D manifolds to frames in a new video sequence. That approach, termed Evolving Time Fronts, enables to manipulate time in dynamic video scenes.

Graph partitioning and graph-based cost minimization techniques are widely used in image and video processing applications such as image restoration, image segmentation, object recognition and shape reconstruction. A graph representing an image is partitioned into two disjoint subsets based on similarity measures and constraints. One method uses graph cuts to patch 2D or 3D textures into images.

SUMMARY OF THE INVENTION

The embodiments of the invention provide a method and system for content aware image and video resizing. The method removes or inserts 1D pixel seams for 2D images, and 2D manifolds for 3D space-time volumes, such as videos.

The invention uses graph cuts that are suitable for 3D volumes. In a grid graph, nodes, representing pixels in an input image, are connected by directed arcs. In this formulation, a seam is defined by a cut on the arcs in the grid graph, such that pixels in the resulting seam is monotonic and connected, i.e., immediately adjacent.

In addition, the invention provides an energy function that improves the visual quality of resized images and videos. The invention uses forward energy and applies seams to the input image to produce an output image such that a change in energy ($\Delta E$) in the output image, compared with the input image is minimized.

This criterion can be expressed as $$\Delta E = |E(I_O) - [E(I_I) - E(C_i)]|,$$

where E is an energy function, e.g., pixel-wise intensity differences, $I_I$ is the input image, $I_O$ is the output image, and $C_i$ is a seam of pixels with an associated cost.

BRIEF DESCRIPTION OF THE DRAWINGS

FIG. 4A-4C are schematics of graph cuts according to embodiments of the invention;

DETAILED DESCRIPTION OF THE PREFERRED EMBODIMENTS

Figure 1:
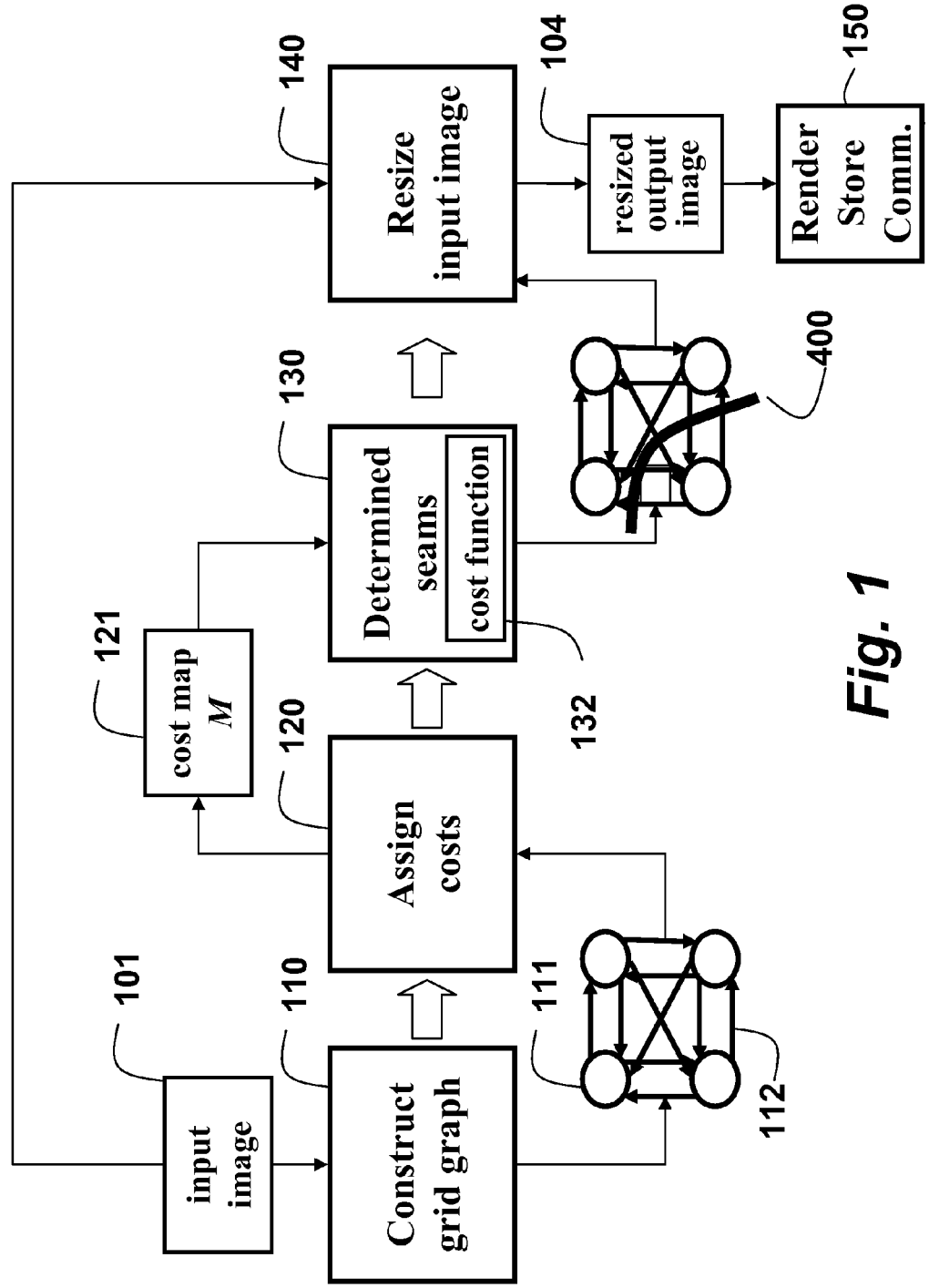
FIG. 1 is a flow diagram of a method for content aware image resizing according to an embodiment of the invention.

The embodiments of our invention provide a method for resizing images and videos using seams of pixels obtained from graph cuts. As defined herein, a 'seam' is a monotonic and connected path of pixels going from the top edge of an image to the opposite bottom edge, or alternatively, from the left edge to the opposite right edge. For a video, i.e., a temporal sequence of images, the seams can be 2D manifolds in a temporal dimension. By removing or inserting one seam, the size of the image is reduced or increased by one pixel in the horizontal, vertical or temporal dimension. Seams can be removed or inserted repeatedly to produce an output image of a desired size.

In a video, we determine a 2D seam (manifold) in a sequence of frames. Seams can be applied iteratively to increase or decrease the size of the output image, or to remove specific portions in the input image to effect object removal. The size of the input image can be increased by duplicating pixels of the seam, and optionally blending the resized pixels into the output image.

In some embodiments, the energy in an image is related to pixel intensity, color or motion in the case of videos. The energy in an image can be determined according to an energy function. For example, the energy function can consider measures of local salience, including local changes in intensities, luminosity, color, apparent motion, and iconicity as described herein.

We construct a grid graph of nodes connected by directed arcs. There is a node for each pixel in the input image, and the directed arcs are assigned costs based on the energy of the pixels. Directed arcs with infinite costs are used to enforce monotonicity and connectivity constraints as described below in greater detail.

Alternatively, we search for regions that are of low importance in video frames. This is done by evaluating an energy function on each frame independently, and then taking a maximum energy at each pixel location. This energy is used to resize all frames. We call the seams determined by this static method "static" seams, because they do not change over time, from frame to frame.

In our earlier U.S. patent application Ser. No. 11/682,521, "Method for Retargeting Images," filed by Avidan et al., on Mar. 6, 2007, also assigned to Mitsubishi Electric Research Laboratories, Inc., we described a content based image retargeting method that removed minimum cost seams from the input image using dynamic programming, However, some output images still had annoying artifacts. We realize that those artifacts occurred because we did not consider the impact of seam removal on the energy of the resized output image. In our earlier work we minimized the change in energy in the input image due to the seam removal, i.e., the backward energy. Now, we minimize the change in energy in the output image, i.e., forward energy. We also realize that our previous method is not practical for resizing videos.

The present invention addresses these issues by using cuts on multi-dimensional grid graphs, instead of dynamic programming as before. In addition, instead of removing minimal cost seams, we now minimize the change in energy in the resized output image when compared with the input image.

We treat an input video as a 3D volume of images (temporally ordered sequence of frames), and extend seam carving from 1D seams on 2D images, to 2D manifolds on 3D volumes. The intersection of the manifolds with each frame defines the seams on the frame. The manifolds are found using a forward energy function that reduces both spatial and temporal artifacts considerably in the resized output video. Because we construct the 2D connected manifold 103 through the 3D space-time volume, the dynamic programming approach used for image resizing by Avidan et al. is not possible. Therefore, our method uses graph cuts.

However, a conventional graph cut does not always define a valid seam under our novel monotonicity and connectivity constraints.

We define a novel graph cut that generates a monotonic and connected seam. This means the seam is one pixel wide and the pixels in the seam are connected, i.e., immediately adjacent in either the horizontal or vertical direction. Using this definition, we extend seam carving to videos and define a monotonic and connected 2D manifold seam through the video volume. We also describe a multi-resolution approach, which decreases the processing time for resizing a video.

In addition, we define a seam carving criterion that better protects salient spatial, as well as temporal content. This improves the visual quality of our resized images and videos considerably. The new criterion minimizes the change in energy in the resized image, and not the cost of the seam that is removed or inserted as in the prior art.

Minimizing Forward Energy Change

The above criterion that minimizes the change in energy can be expressed as $$\Delta E = |E(I_O) - [E(I_I) - E(C_i)]|,$$

where E is an energy function, e.g., pixel-wise intensity differences), $I_I$ is the input image, $I_O$ is the output image, and $C_i$ is a seam of pixels with an associated cost.

Video Resizing

The difficulties imposed by video resizing using seam carving can be characterized as procedural, dimensional and cardinal.

The procedural difficulty follows from the fact that we cannot directly extend the prior art dynamic programming method of Avidan et al. to the 3D video volume.

Dimensional difficulties originate from the additional, temporal, dimension of the video, which increases spatial artifacts and introduces motion related artifacts.

Cardinal difficulties stem from the fact that a video is a sequence of frames, and hence, any processing of the video sequence involves huge amounts of data. For example, the required data for an entire video cannot be stored in a random access memory. Therefore, these data are stored on disk, and loaded on demand before the output frame is rendered.

We address these difficulties, and describe video resizing applications, such as size reduction and expansion, multi-size videos for interactive size manipulation, and object removal.

Method Operation

FIG. 1 shows the steps of the method according to one embodiment of the invention. A grid graph 111 is constructed 110 from an input image 101 or a sequence of images (frames) in the case of a video. For a single image, the grid graph is two-dimensional in a (X, Y) plane, and for a sequence of images, as in a video, the grid graph is three-dimensional volume (X, Y, T).

The grid graph includes one node for each pixel in each image. Adjacent nodes in the grid graph are connected by directed arcs 112. The directed arcs go horizontally forward and backwards, vertically up and down and diagonally backward.

Costs are assigned 120 to the arcs 112 the grid graph 111 using an energy function E(f). The energy function is computed on the input image. The costs can be used to construct a cost matrix or map 121, which essentially reflect the global energy in the images. In the case of one image, the cost map is in the (X,Y) plane. In the case of the video, the cost map can be in either the (X, T) plane or the (Y, T) plane. Costs are assigned to the directed arcs connecting adjacent nodes. In the preferred embodiment, the costs are based on gradient magnitudes of intensities between adjacent pixels in the input image. That is, the costs are defined on the arcs connecting adjacent nodes.

The arcs are cut 400 according to a cost function 132 using the cost map M. Pixels corresponding to the nodes adjacent to one side of the cut form a seam. The coordinates of the pixels in each seam enforce monotonicity and connectivity constraints. The constraints, which are enforced by the costs on the arcs, are described in greater detail below.

Then, the input image 101 is resized 140 according to the seams 400 to produce the output image 104, such that a change in energy of the output image, with respect to the input image, is minimized while preserving salient visual content from the input image in the output image. The resizing can add or remove pixels. The output image can then be rendered, stored, communicated, or further processed 150.

The following method can be applied to a video acquired with a static camera. For general videos see the graph-cut based seam method described below.

In a video sequence of N frames, each frame has $\{I_t(i,j)\}$ pixels, for horizontal and vertical coordinates i and j, and time steps t (frames), t=1 to N. In one embodiment, the energy function is based on the $L_1$-norm. For the $L_1$-norm, the cost of the arc between two adjacent pixels is the sum of the absolute differences of their intensities (energy). The $L_1$-norm is also known as the rectilinear, city block, or Manhattan distance.

We combine a spatial $L_1$-norm gradient magnitude energy $E_{spatial}$ with a temporal gradient magnitude energy $E_{temporal}$ to produce a spatio-temporal $L_1$-norm gradient magnitude energy $E_{global}$ as follows $$E_{spatial}(i, j) = \max_{t=1}^{N}\left\{\left|\frac{\partial}{\partial x}I_t(i, j)\right| + \left|\frac{\partial}{\partial y}I_t(i, j)\right|\right\}$$

$$E_{temporal}(i, j) = \max_{t=1}^{N}\left\{\left|\frac{\partial}{\partial t}I_t(i, j)\right|\right\}$$

$$E_{global}(i, j) = \alpha \cdot E_{spatial} + (1-\alpha)E_{temporal},$$

where $\alpha \in [0, 1]$.

For videos, the energy measure is a maximum (max) projection of the spatial $L_1$-norm gradient magnitude energy to 2D, where α is a parameter that balances spatial and temporal energy contributions. In practice, because motion artifacts are more noticeable, we bias the energy toward temporal importance, e.g., α=0.3. We use a maximum projection, and not an average, to be conservative in our energy calculation.

As an advantage, our static method is simple and fast. It gives good results when the video is acquired by a stationary camera, and the foreground and background are easily identified. However, in videos of more complex scenes, or where the camera is moving or when multiple motions are present, our seams can dynamically adapt over time.

To this end, we define a video seam as a connected 2D manifold in space-time that 'cuts' through a 3D video volume. The intersection of the surface with each frame defines one seam in the frame. Hence, removing this manifold one seam from each video frame. Because the manifold is connected, the seams preserve temporal coherency of the video.

Seam Carving Using Graph Cuts

We first described a general formulation of our seam carving as a graph cut problem on images, and then extend the seam carving to videos. For simplicity of this description, we search for vertical seams in the image. For horizontal seams all graph constructions are the same, with an appropriate 90° rotation.

As shown in FIG. 3A-E, the nodes in the grid graph are connected by directed arcs. We construct a grid graph from the input image 101 in which every node 301 represents a pixel $p_{i,j}$, immediately adjacent nodes in the graphs 302 are connected by the arcs 302, see FIGS. 3A-3E.

Virtual terminal nodes S (source) and T (target) are constructed in the graph by connecting infinite (∞) cost arcs to all edge nodes corresponding to pixels of the leftmost and rightmost columns of the image for horizontal seams, and the edge nodes corresponding to the top and bottom rows for vertical seams. The terminal nodes act as immovable 'anchors' on the edges of graph and the images.

As defined herein, a cut extends from one edge of the grid graph to a directly opposite edge of the grid graph. Thus, an source-to-target (S/T) cut, or simply a 'cut' C 400 on the grid graph is defined as a partitioning of the nodes in the graph (and the corresponding pixels represented by the nodes) into two disjoint subsets S 311, and T 312, such that s∈S and t∈T, see FIGS. 3A-3E and 4A-4C. Effectively, the cut is through the arcs connecting the nodes. After the cut, and removal (or insertion) of the seam adjacent to one side of the cut, the grid graph can then be reconnected with new arcs and costs, and a new cost map can be computed.

The total cost of a cut C={S, T} is defined as a sum of the cost of the individual arcs (p, q) that are cut, where p∈S, and q∈T. Note here, the costs are assigned to the arcs and not the pixels as in our previous work by Avidan et al. The costs are summed only for forward directed cuts. That is, the infinite costs of the arcs in the backward direction do not affect the total cost of the cut. To determine 130 a seam from a cut, we select the pixels immediately adjacent to one side of the cut, e.g., to the left of the cut for a cut extending form the top to bottom edge.

Graph cuts are known. In graph theory, a cut is a partition of vertices of a graph into two sets. More formally, let G(V, E) denote a graph. A cut is a partition of the vertices V into two sets S and T. Any edge (u, v)∈E with u∈S and v∈T (or u∈T and v∈S, in case of a directed graph) is said to be crossing the cut and is a cut edge.

However, there are a number of crucial differences between our method and conventional graph cuts. Conventional graph cuts have been used for texture synthesis, and not content aware image resizing. In addition, the conventional grid graph is a very simple four-connected graph without directionality, see FIG. 3A. That graph does not define a valid seam for our seam carving, because it does not satisfy our monotonicity and connectivity constraints.

Monotonicity Constraint

The coordinates i and j of the pixels p in the seam must increase monotonically in a selected direction of the seam, e.g., $$[p_{i,j} \rightarrow p_{i+n,j}],$$

$$[p_{i,j} \rightarrow p_{i,j+n}], \text{ or}$$

$$[p_{i,j} \rightarrow p_{i+n,j+n}].$$

Connectivity Contraint

Nodes representing pixels in the seams must be adjacent and directly connected by one arc, i.e., n=1 in the above monotonicity constraint.

The monotonicity and connectivity constraints, in combination, make the seams exactly one pixel wide and extend the seam continuously from one edge of the image to the directly opposite edge of the image.

Hence, the challenge is to construct a grid graph that guarantees the resulting seam satisfy these constraints.

Graph Cuts for Images

In our grid graph, every node (pixel) $p_{i,j}$ is 8-connected to its immediate neighbors. Following the $L_1$-norm gradient magnitude $E_1$ energy, we define the cost of arcs as the forward difference between the cost corresponding pixels in the image either in the horizontal direction or vertical directions as shown in FIG. 3E as $$\partial x(i,j)=|I(i,j+1)-I(i,j)|, \text{ and}$$

$$\partial y(i,j)=|I(i+1,j)-I(i,j)|.$$

Figure 2:
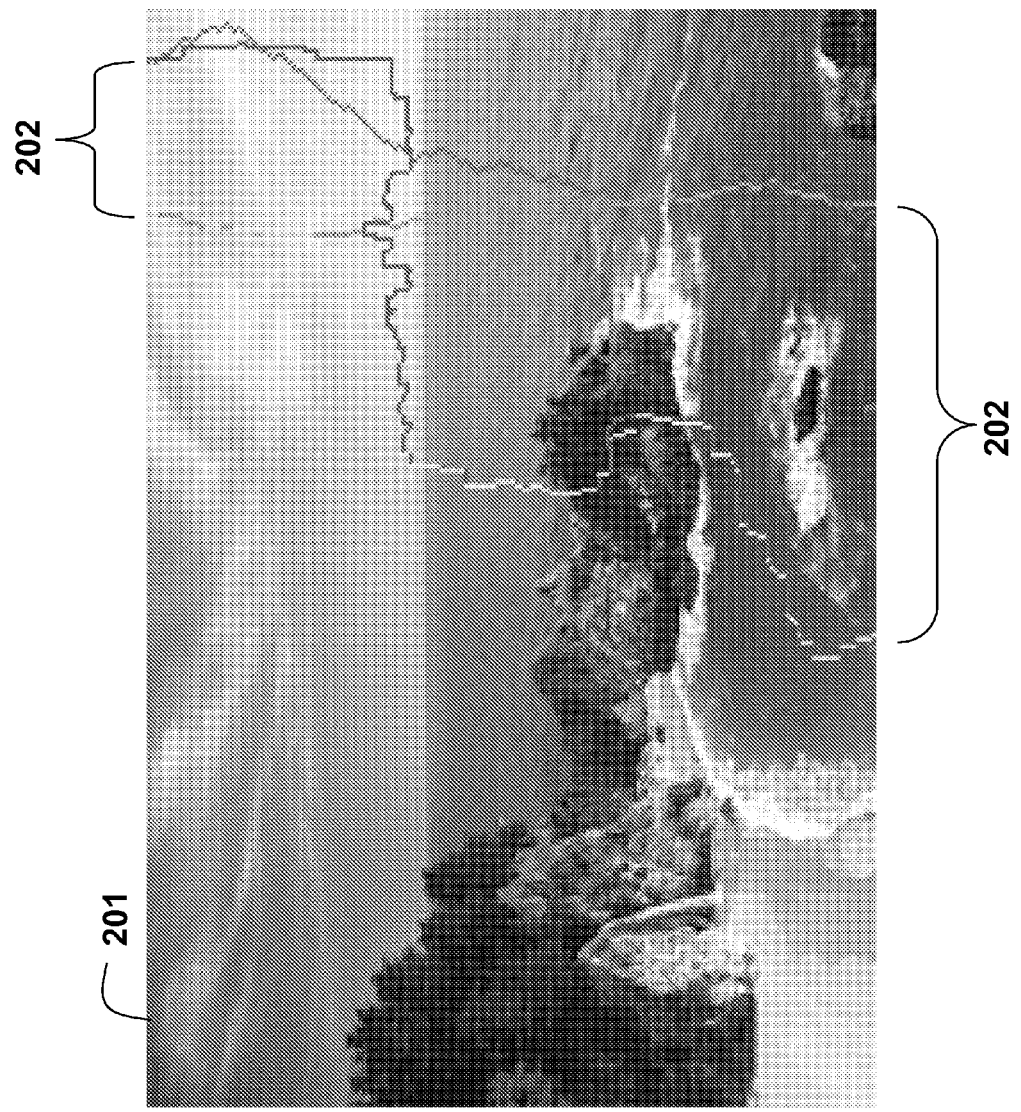
FIG. 2 is an example input image including seams for different grid graph constructions.

FIG. 2 shows an input image 201 of a seaside waterfall, and four seams 202 cut on the image for various graph constructions. The possible partitioning 301 corresponding to the four seams are respectively shown in FIGS. 3A-D. Each seam is composed of the pixels immediately to the left of a vertical cut. The seams for a horizontal cut would be immediately below the cut.

The different possible graph constructions for the purpose of image resizing are shown in FIGS. 3A-3D by four nodes representing four adjacent pixels in the image. The actual grid graph is constructed by tiling these graphs over the entire the image.

Figure 3A:
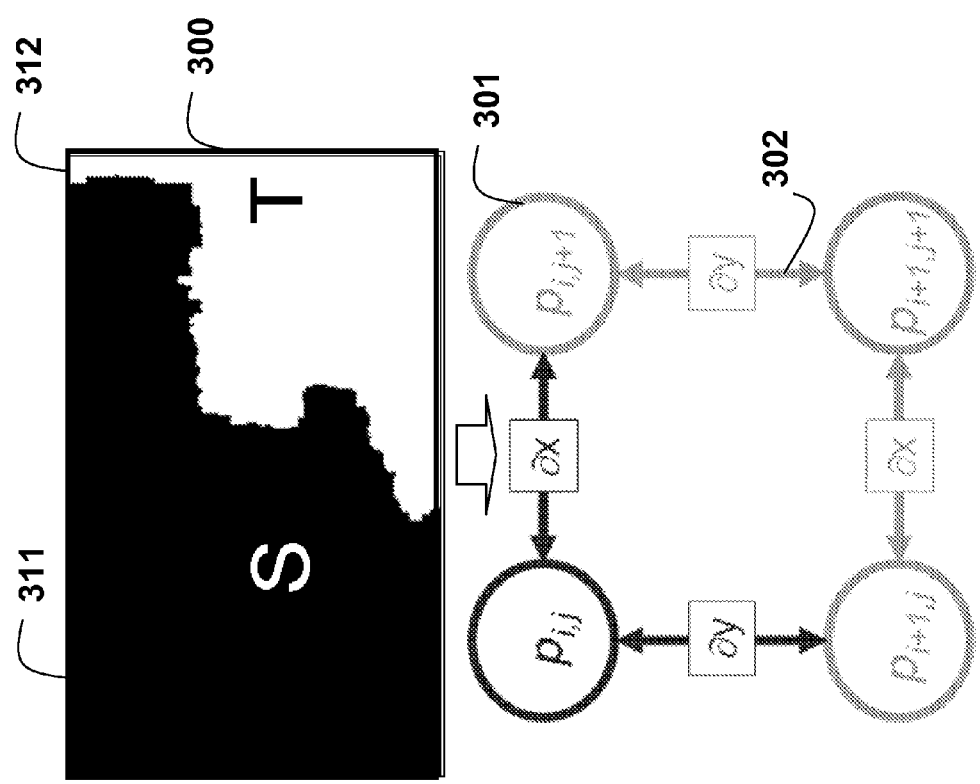
FIGS. 3A-3D are block diagrams of image partitions and corresponding grid graph for the seams of FIG. 2.
Figure 3B:
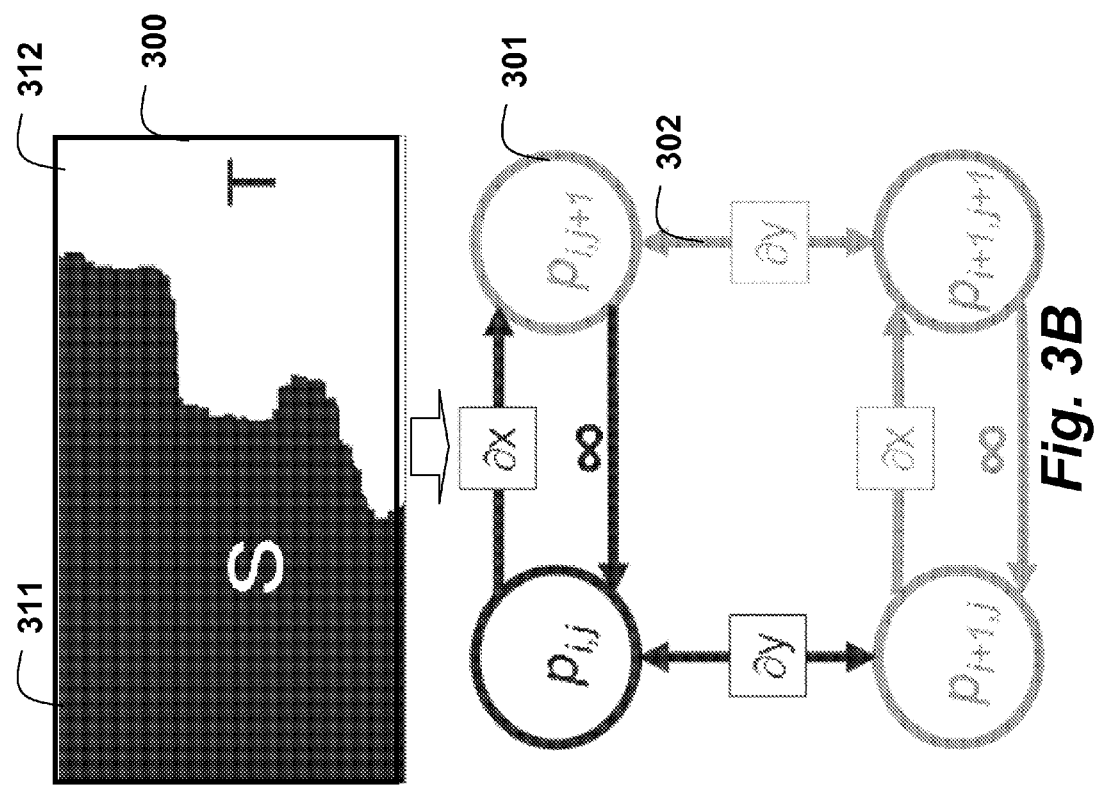
Figure 3C:
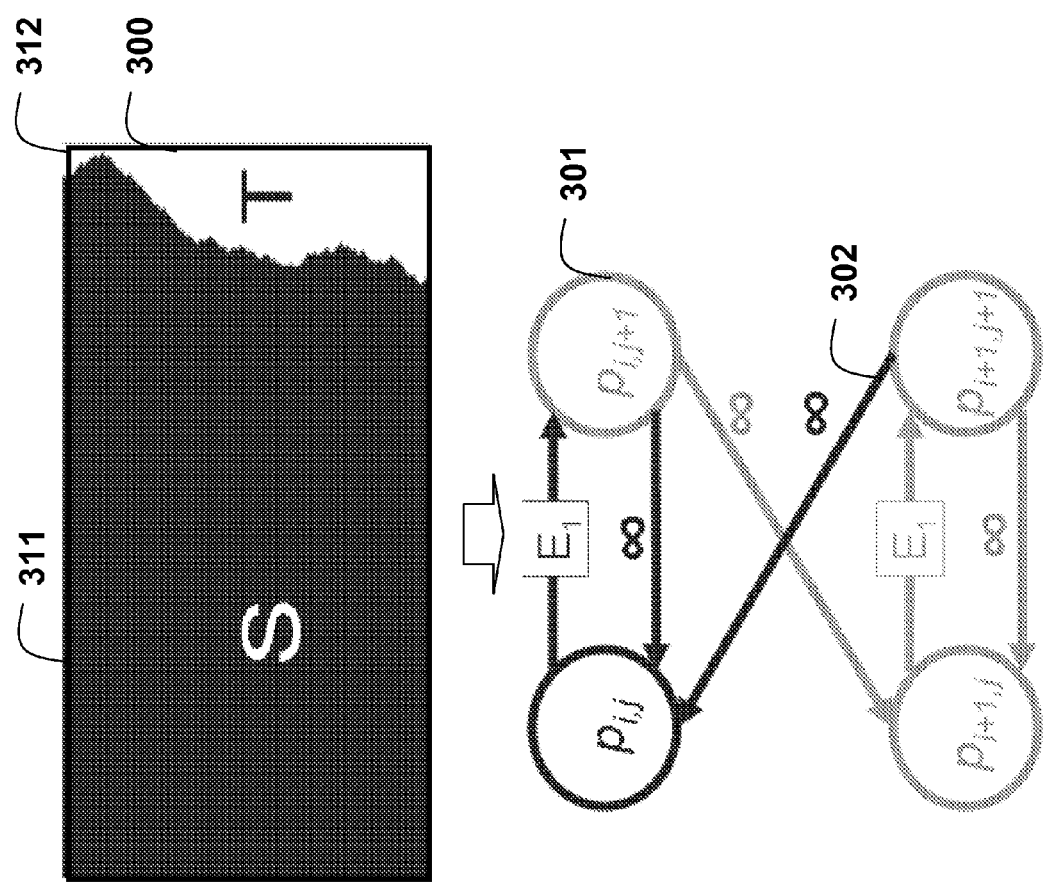
Figure 3D:
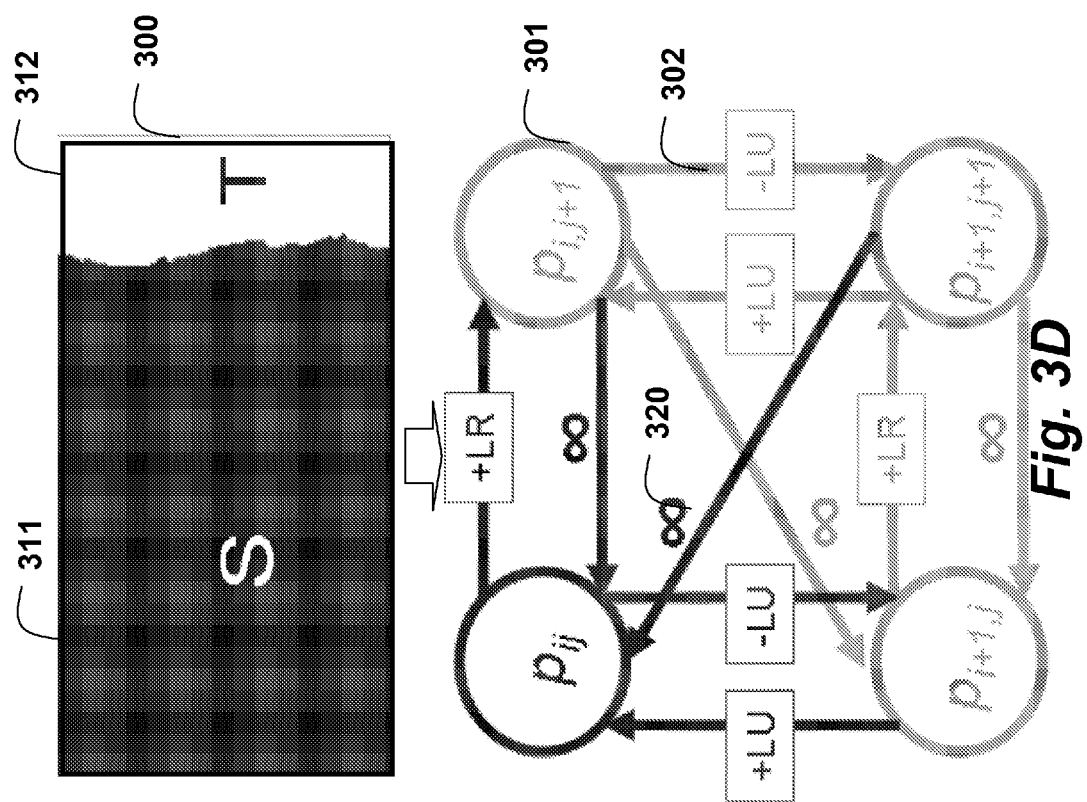
Figure 3E:
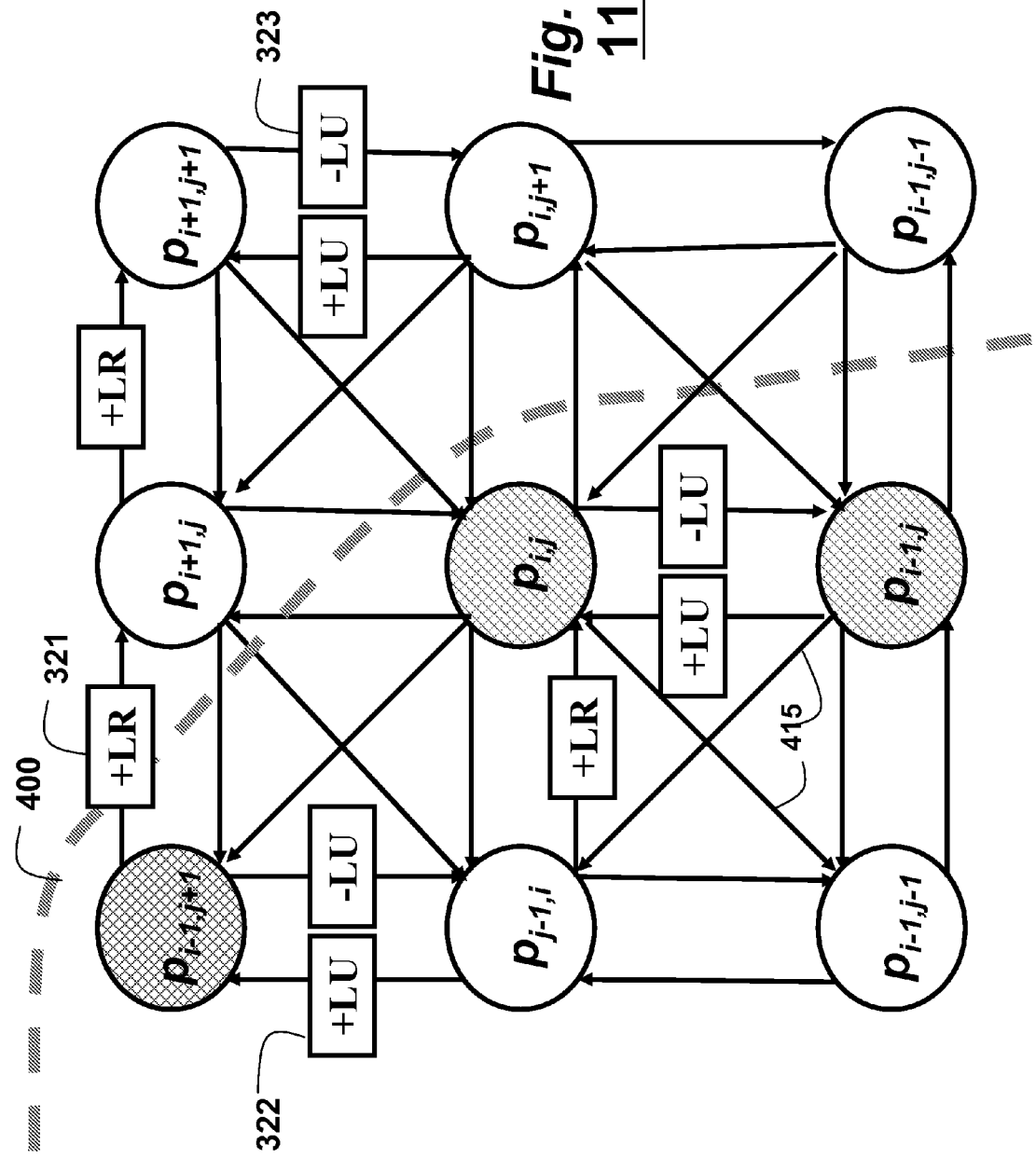
FIG. 3E is a block diagram of a grid graph according to embodiments of the invention.

The conventional graph in FIG. 3A cause a general path and not a valid seam, while the graph in FIG. 3B causes a monotonic but piecewise-connected seam. The graph in FIG. 3C is similar to the seam carving according to Avidan et al. However, we use a grid graph, instead of dynamic programming. The graph in FIG. 3D represents the forward cost function according to the embodiments of the invention. FIG. 3E shows our grid graph in greater detail.

To impose the monotonicity constraint on the cut 400, we use different costs for the different directions of the horizontal, vertical and diagonal arcs. For forward arcs, i.e., in the direction from S to T, we use the costs +LR 321, +LU 322 and −LU 323 as defined below. For backward horizontal and backward diagonal arcs, we use an infinite (∞) cost 320. Note, that in our grid graph, each node other than nodes representing pixels at the edges of the images can be connected by up to twelve directed arcs to eight adjacent nodes, see FIG. 3E.

The following demonstrates why the monotonicity constraint is enforced under our graph construction.

The main difference between our graph cut construction and the prior art dynamic programming approach according to Avidan et al. is that Avidan does not explicitly constraint pixels for the cut to be connected. The Avidan graph cut can pass through several consecutive vertical (or vertical) arcs, in effect generating a piecewise-connected seam.

We belief that continuously connected seams are important to preserve both spatial and temporal continuity and to minimize visual artifacts. To constrain the cuts to be connected, we use backward diagonal arcs 415 with infinite costs.

Seam Constraints

Our grid graph uses horizontal backward arcs with infinite costs to enforce monotonicity. This follows directly from the definition of a cut and from the construction. As terminal node S is connected to all pixels in the leftmost (edge) column of pixels, and every pixel in the rightmost column is connected to terminal node T, every row must be cut in some place in order to generate the disjoint subsets S and T.

The optimal cut passes through each row (or column) Assume there exists a row j in the grid graph, in which the cut passes twice. In fact, the cut must cut a particular row or column an odd number of times. Let us examine two consecutive cuts in row j.

Node (pixel) $p_{i,j}$ is labeled S, nodes $p_{i+1,j}$ to $p_{k-1,j}$ are labeled T, and the nodes $p_{k,j}$ are labeled S. However, this also means that the arc $p_{k,j} \to p_{k-1,j}$, which is an infinite cost arc, must be included in the cut, see FIGS. 4A-4C. This makes it an infinite cost cut, which contradicts optimality because it is always possible to cut only horizontal arcs at some column of the grid and achieve a finite cost cut.

If the source node S is connected to the leftmost column of the image and the target node T to the rightmost column, then all nodes to the left of the cut are labeled S, and all nodes on the right of the cut are labeled T. If we want the graph cut to be connected as well, then we use backward-going diagonal arcs. The same argument, as above, can demonstrate connectivity as shown in FIGS. 4A-C.

Because we use backward horizontal arcs and backward diagonal arcs with infinite costs, our grid graph enforces the seam constraints. Horizontal backward infinite arcs 402 enforce monotonicity as shown in FIG. 4A. Diagonal infinity arcs 415 enforce connectivity. If the cut 400 skips more than one pixel to the left as shown in FIG. 4B, or the right as shown in FIG. 4C, a diagonal cut with an infinity cost from a source node (white) 411 to a target node (black) 412 must be cut.

In fact, by combining the costs of the vertical and horizontal arcs, we can construct a graph whose cuts define seams that are equivalent to one found by the dynamic programming method, see FIG. 3C.

For example, we assign 120 the cost $$C_1(i,j)=\partial x(i,j)+\partial y(i,j)$$

to the horizontal forward arc, and remove the vertical arcs altogether.

A cut in this graph is monotonic and connected. The cut only considers horizontal forward arcs, the remaining infinite cost arcs impose the connectivity constraint and cannot be cut. Hence, our cost is also the sum of all costs $C_1(i,j)$ for all pixels in the seam.

Hence, we can use any energy function defined on the pixels as the cost of the forward horizontal arcs and achieve the same results as seam carving based on dynamic programming. Moreover, high level functions, such as a face detector, or a cost mask defined by a user, can be used in any of our graph constructions. We simply add the cost of the pixel to the horizontal arc going out of the pixel.

Graph Cuts for Video

Figure 5:
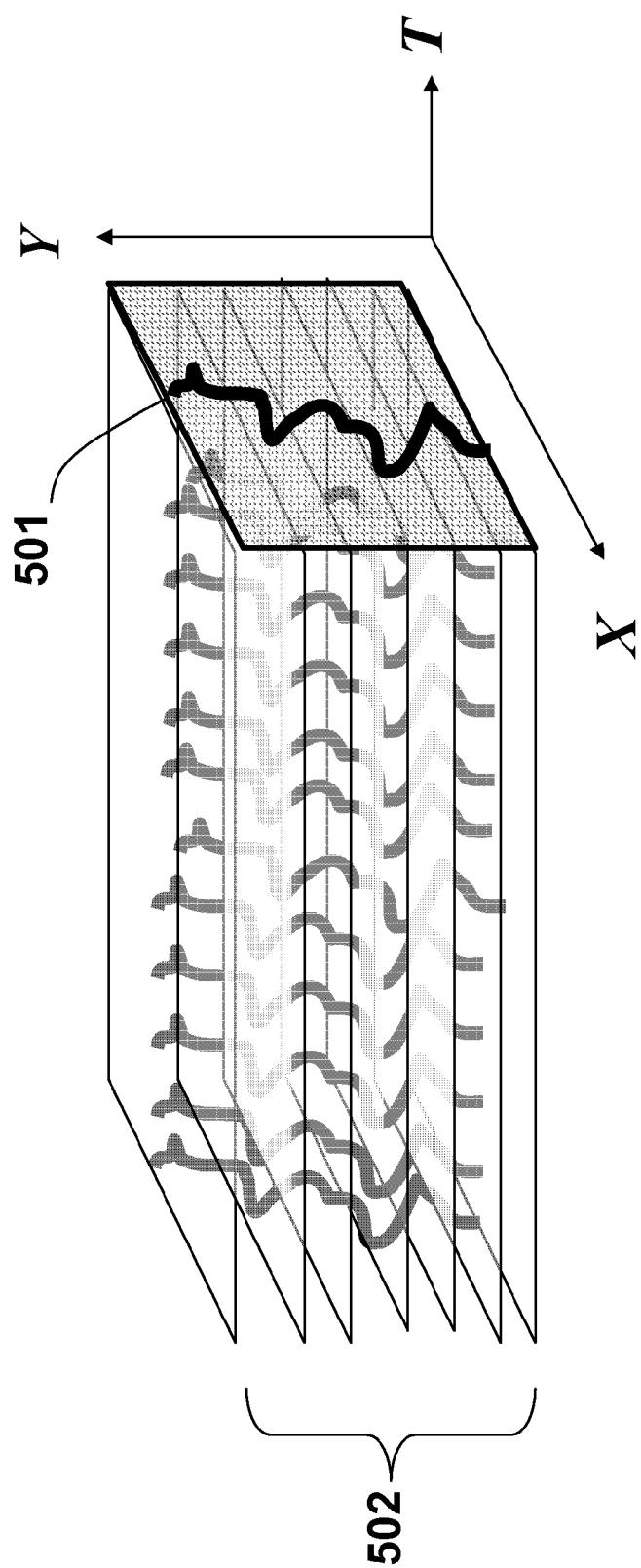
FIG. 5 is a block diagram of a spatio-temporal video volume and seams forming a 2D manifold.

The extension to a video is shown in FIG. 5. We search for a mostly vertical (or horizontal) manifold 501, and we consider the X×T planes 502 in the video volume, and use the same graph construction as in X×Y plane for still images, including backward diagonal arcs with infinite costs for connectivity.

We connect the source and target nodes to all left and right most, or top and bottom most nodes in the horizontal case, all frames respectively. We partition the 3D video volume into source and target sets using graph cut defined on the 2D manifold in the 3D domain. Such a cut is also monotonic in time because of the horizontal constraints in each frame are already in place. This cut is globally optimal in the volume, both in space and time. Restricted to each frame, the cut defines a 1D connected seam.

For the full video volume, the computation time depends on the number of nodes times the number of arcs in the graph, which is quadratic in the number of pixels. Solving minimal cuts on a graph, in which every pixel is represented by a node, is not feasible. To improve efficiency and enable real-time processing, the grid graph is constructed on multiple resolutions from low to high.

An approximate minimal cut is first computed on a graph with a lowest resolution, and then iteratively refined at higher resolutions. Coarsening is performed by down-sampling the graph both spatially and temporally, while refinement is done by computing the graph cut on a narrow band introduced by the cut that was computed at the coarser level. In our case, the band takes the form of a 'sleeve' cutting through the spatio-temporal volume.

The graph cut approach to seam carving enables us to extend the benefits of content aware resizing to videos. However, a single cost function does not perform properly in all cases. Therefore, we provide a cost function that better preserves content, and improves resizing for videos.

Forward Energy

Artifacts in video frames cause by the prior art resizing, according to Avidan et al., can also be seen in static images. The artifacts are cause because the prior art resizing removes the seam with the least amount of cost from the input image, ignoring energy that is inserted into the resized image, i.e., forward energy. The inserted energy is due to removing (or inserting) pixels so that previously non-adjacent pixels now become adjacent after the seam application. Thus, the change in energy in the resized image can increase or decrease with each seam removal, see FIG. 6.

In the graph cut implementation according to embodiments of the invention, the cost of the image is no longer an attribute of the pixels as in the prior art, but rather an attribute of the arcs in the graph. Hence, the total cost of an image is the sum of the finite costs all cuts, and the cost of each seam is the cost of the corresponding cut C. Thus, the energy difference after the $i^{th}$ seam carving resizing is $$\Delta E_{t=i+1} = E(I_{t=i\leq 1}) - [E(I_{t=i}) - E(C_i)] \quad (1)$$

where t represents time (frames), and C the cost of the cut corresponding to the seam.

The energy difference can actually increase, as well as decrease, for different seam removals. The invention minimizes the change in energy in the resized image.

Figure 6:
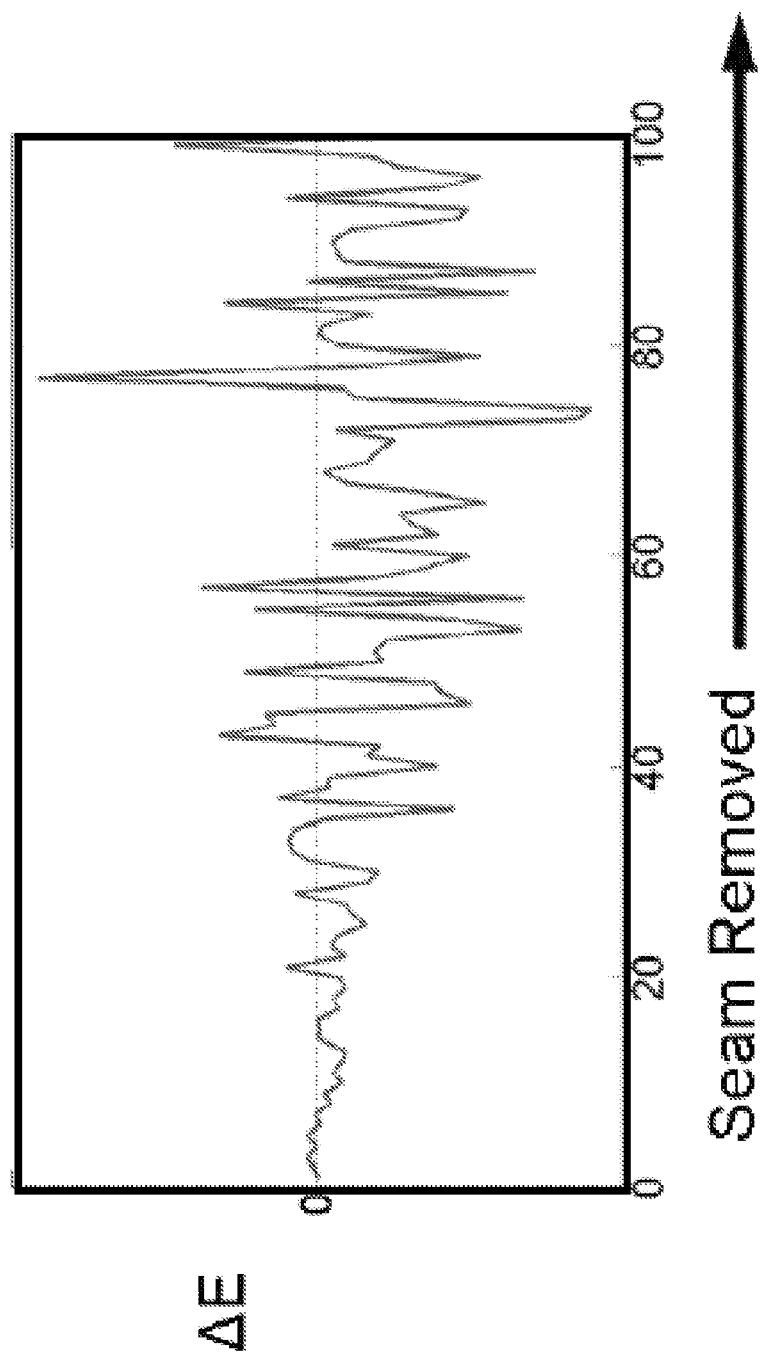
FIG. 6 is a graph of energy change in an output image as a function of removed seams.

FIG. 6 shows the actual (normalized) change in energy $\Delta E$ (vertical axis) in the output image after each seam is removed (horizontal axis). The reason for the change $\Delta E$ is that after the seam is removed (or inserted) the pixels to the right (or bottom) of the cut will have new adjacent pixels. Thus, when the energy and costs are recomputed, they can actually increase or decrease.

Therefore, we provide a criterion for selecting the optimal seam. Our criterion looks forward at the output image, in contrast to looking backwards at the input image before removing the minimal cost seam, as in the prior art.

At each step, we search for a seam, which when removed, minimizes the change in energy in the resized output image after the seam is removed. These are seams that are not necessarily minimal in their cost themselves, as in the prior art.

First, we describe the energy function for still images, and then we described an extension of the cost function to videos. As the removal of a connected seam only affects the energy at a local neighborhood of pixels, it suffices to examine a small local region of pixels adjacent to the removed (or inserted) pixel.

We consider the energy of the resized image by removing certain pixel to be due to the new "pixel-boundary" created in the resized image. The energy of the pixels at the cut boundary is measured as the forward energy differences between the pixels that become new adjacent pixels, after the seam is removed (or inserted).

Figures 7A, 7B, 7C:
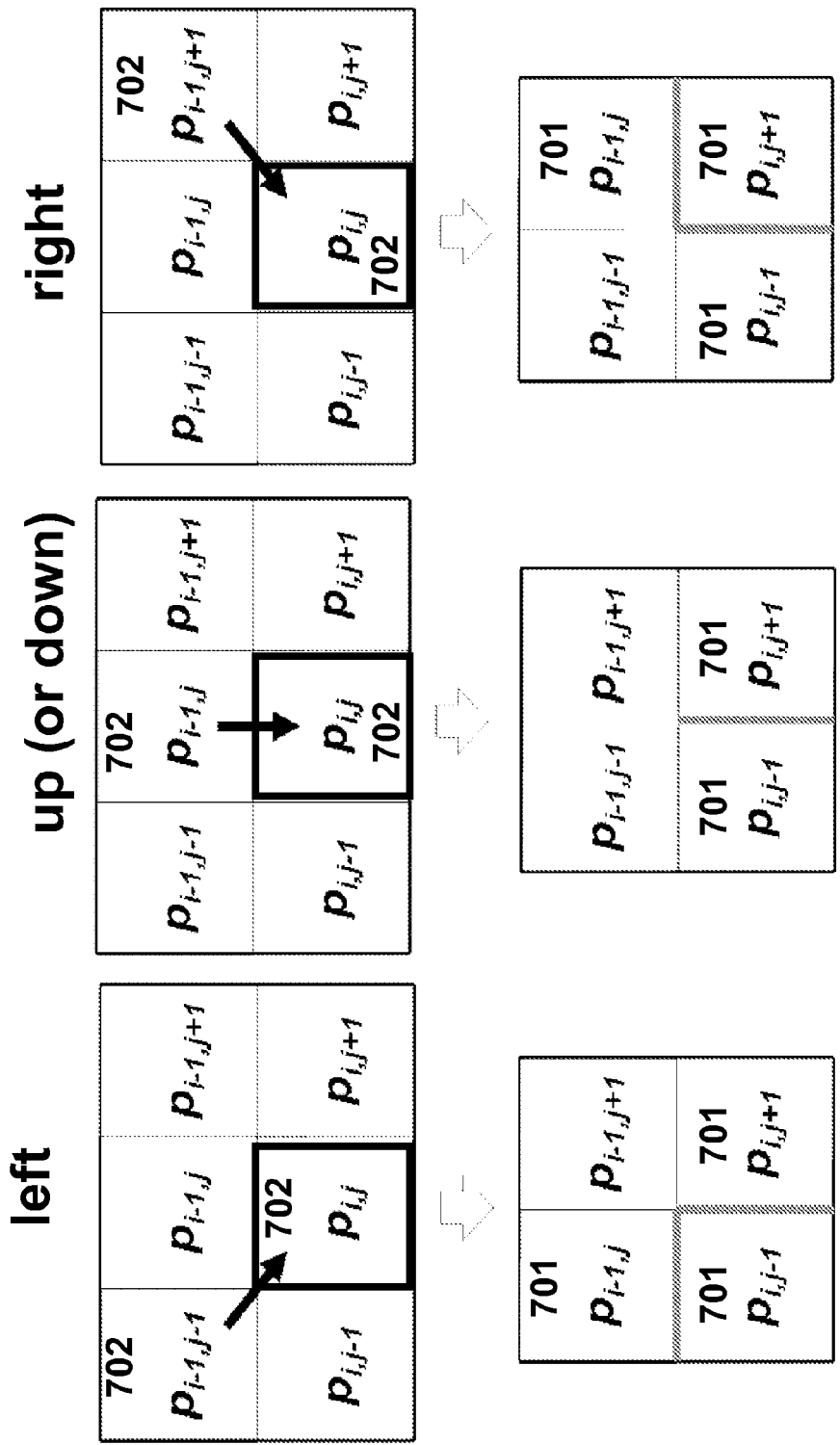
FIG. 7A-7C show three possible directions for a vertical seam.

Depending on the direction of the seam, three such cases are possible as shown in FIGS. 7A-7C for a vertical seam, left, up (or down) and right. After removing the seam, new neighbors 701, and new pixel edges 702 are created. In each case the cost is defined by the forward difference in the newly created pixel edges. Note that the new edges created in row i−1 were accounted for in the cost of the previous row pixel.

For each of three possible cases, we define a cost respectively as:

$$C_L(i,j) = |I(i,j+1) - I(i,j-1)| + |I(i-1,j) - I(i,j-1)| \quad (a)$$

$$C_U(i,j) = |I(i,j+1) - I(i,j-1)| \quad (b)$$

$$C_R(i,j) = |I(i,j+1) - I(i,j-1)| + |I(i-1,j) - I(i,j+1)|, \quad (c)$$

a.
where $C_L$, $C_U$, and $C_R$ are the left, up and right costs, respectively FIGS. 7A-C.

We use these costs in the accumulative cost map M 121 to determine the seams. For vertical seams, each cost M(i,j) is updated using the following function:

$$M(i,j) = P(i,j) + \min \begin{cases} M(i-1,j-1) + C_L(i,j) \\ M(i-1,j) + C_U(i,j), \\ M(i-1,j+1) + C_R(i,j), \end{cases} \quad (2)$$

where P(i,j) is an additional based cost measure, such as a result obtained from a high level task, e.g., a face detector, or an user cost, that can be used in addition of our forward cost.

Forward Cost in a Graph Cut

To determine the forward cost of a graph cut, we construct a graph where the arc costs define the cost incurred by removing a particular pixel according to the three possible seam directions.

A new horizontal pixel-boundary $p_{i,j-1}p_{i,j+1}$ is generated in all three cases because pixel $p_{i,j}$ is removed, as indicated by heavy lines. Hence, we assign the cost difference 321 between the left and right neighbors as $$+LR = |I(i,j-1) - I(i,j+1)|$$

to the graph arc between the nodes representing $p_{i,j}$ and $p_{i,j+1}$.

To enforce the seam monotonicity constraint as described above, we connect nodes $p_{i,j+1}$ and $p_{i,j}$ with a backward arc with an infinite cost. We also add diagonal backward arcs with infinite costs to preserve connectivity.

Next, we account for the cost due to new vertical pixel-edges. In the case of a vertical seam step as shown in FIG. 7B, there are no new vertical edges so no cost is inserted. Now we have that all nodes to the left of the cut are labeled S and all nodes on the right of the cut are labeled T.

By definition, the cost of a cut only considers arcs directed from nodes labeled S to nodes labeled T. Therefore, it follows that only upward vertical arcs are counted in a right-oriented cuts as shown in FIG. 7A, and only downward vertical arcs are counted in a left-oriented cuts as shown in FIG. 7C. Hence, we assign the cost difference 322 between the left and up neighbors as $$+LU = |I(i-1,j) - I(i,j+1)|$$

to the upward vertical arc between pixels $p_{i,j}$ and $p_{i-1,j}$, and the cost difference 323

$$-LU = |I(i-1,j) - I(i,j-1)|$$

to the downward vertical arc between pixels $p_{i-1,j}$ and $p_{i,j}$, where −LU means the difference between the left and up neighbors with respect to the end point of the arrow.

Figure 8A:
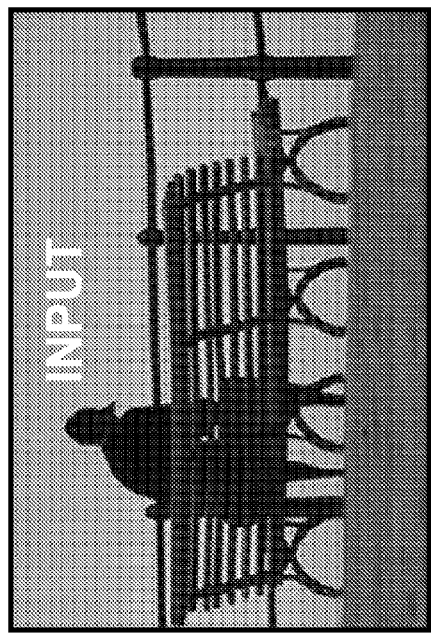
FIGS. 8A-8C compare a prior art output image with an output image obtain from an input image according to an embodiment of the invention for an input image, respectively.
Figure 8C:
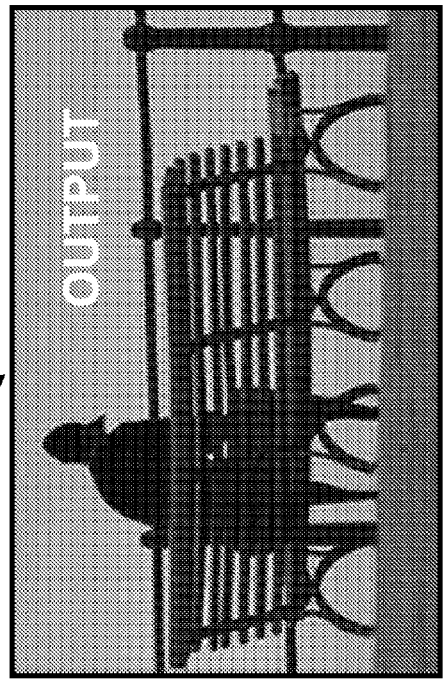
Figure 8B:
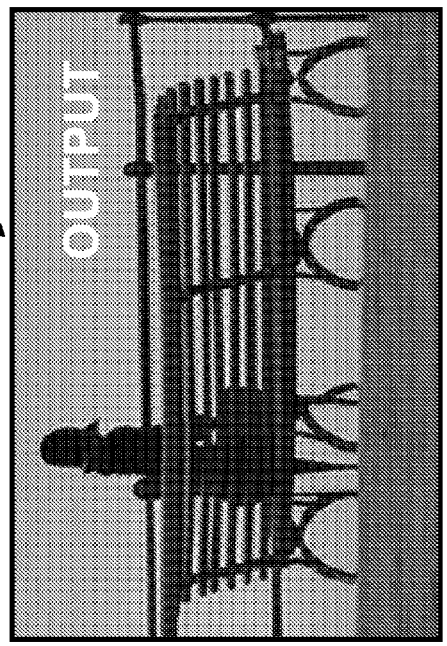

FIGS. 8A-8B show the dramatic difference between removing seams using the backward cost function of the prior art, and the forward energy function according to the invention from an input image in FIG. 8A. In the prior art output image 8B, the person sitting on the bench is noticeably distorted, and one of the fence posts has been thinned considerably. In the output image of FIG. 8C none of these artifacts are present.

Figure 9A:
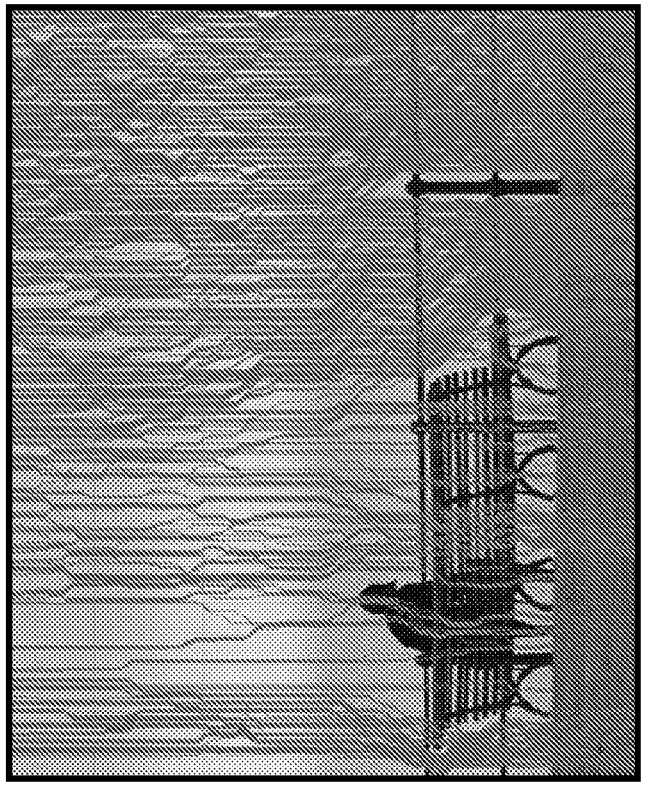
FIGS. 9A-9B show images with prior art seams and seams according to an embodiment of the invention.
Figure 9B:
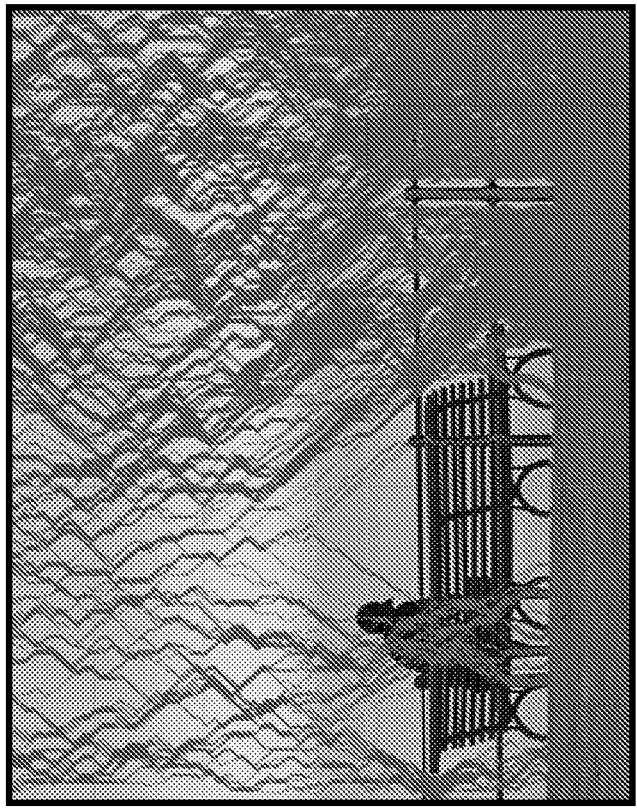

FIGS. 9A-9B show the corresponding seams, with fewer cuts through the person and post in FIG. 9B. This clearly shows that the forward energy seams of the present invention are better.

Figure 10A:
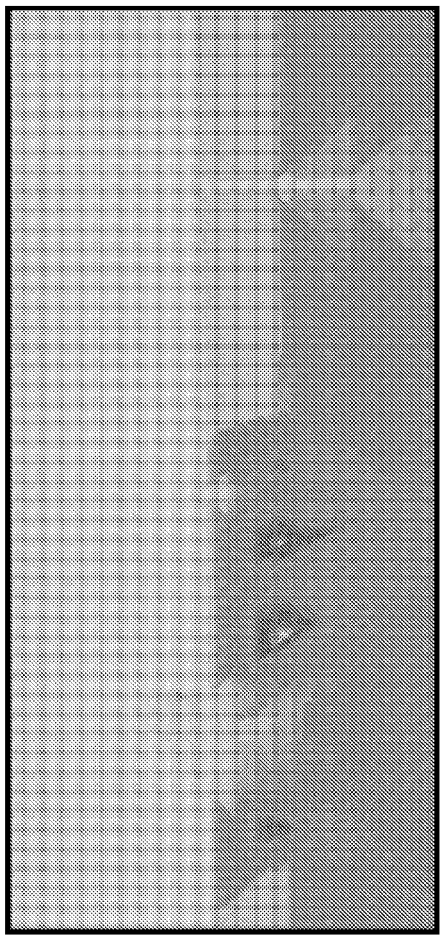
FIGS. 10A and 10B show corresponding energy images to FIGS. 9A-9B.
Figure 10B:
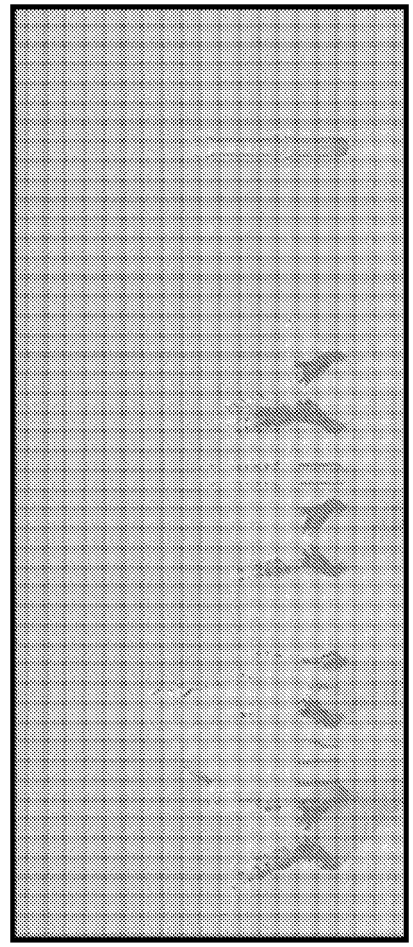

FIGS. 10A-10B show the respective cost maps, which clearly indicate that the cost due to salient content is better preserved in the cost map of the present invention as shown in FIG. 10B. As shown in FIG. 10A, the cost increases with every crossing of every bar on the bench, as the bar defines an edge in the image. In the FIG. 10B, vertical seams can intersect the bars without substantially increasing the cost in the output image.

For a video, we examine slices in the 3D video-volume depending on the seam direction. For vertical seams, i.e., the Y-direction, the intersection of every slice on the (X×T) dimension with the seam creates a seam on that plane. Hence, we define the cost of every pixel removal as the new temporal pixel-edges created between frames in the temporal direction, which are introduced to the video when this pixel is removed. Then, we create arcs between nodes in the graph and between time-steps (frames) with the appropriate costs as in the spatial X×Y domain.

As described above, other energy functions can also be used with our resizing, such as a saliency map, object detectors and manually inserted energies. By marking pixels with large energies, the user can protect certain parts of a video during the resizing process. Because our approach is global, the user does not have to mark every frame, but only once every k frames. In practice, we mark every tenth frame. By supplying negative costs, the user can also attract seams to desired parts of the video, for example, for object removal.

Our forward energy criterion preserves the content and structure of image or video. However, enforcing the structure can sometime come at the expense of content. For example, important objects that can be resized without noticeable artifacts, i.e., inserted cost, may be jeopardized during resizing. In such cases, a combination of the forward criteria with the cost $E_1$ can help to achieve better results. This is because cost $E_1$ can better protect content.

EFFECT OF THE INVENTION

We provide an improved seam carving operator for image and video resizing. Video resizing is achieved using graph cuts. We also provide a forward looking energy function that measures the effect of seam carving on the output image, not the input image.

Our energy measure can be used by either graph cuts or dynamic programming Our methods can also be adapted to resize videos temporally. By rotating the video volume to the Y×T view, we can find seam manifolds that cut through the temporal domain. Those manifolds, when removed, decrease the length of the video.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for resizing images, comprising the step of:
constructing a grid graph from an input image, the grid graph includes one node for each pixel in the input image, wherein adjacent nodes in the grid graph are connected by arcs, and each arc is directed and associated with a cost;
applying a cut to the arcs of the grid graph using a cost function;
determining a seam of pixels from the cut, in which the pixels in the seam correspond to nodes in the grid graph immediately adjacent to one side of the cut, and wherein coordinates of the pixels in the seam enforce monotonicity and connectivity constraints; and
resizing the input image according to the seam to produce an output image while minimizing a change of energy in the output image when compared with the input image.

2. The method of claim 1, wherein the grid graph is constructed from a temporal sequence of images, and the grid graph is three-dimensional, and the seam forms a manifold in space dimensions x and y, and a time dimension t of the grid graph.

3. The method of claim 2, wherein the energy is based on intensities of pixels, and the costs are determined by an energy function.

4. The method of claim 3, wherein the energy function considers local changes in intensities.

5. The method of claim 1, further comprising:
enforcing the monotonicity and connectivity constraints using the costs of the arcs.

6. The method of claim 1, wherein the minimizing is expressed as $$\Delta E = |E(I_O) - [E(I_I) - E(C_i)]|,$$

where E is an energy function, $I_I$ is the input image, $I_O$ is the output image, and $C_i$ is a seam of pixels with a cost associated with the cut.

7. The method of claim 1, further comprising:
rendering the output image.

8. The method of claim 1, wherein the energy combines a spatial $L_1$-norm gradient magnitude energy $E_{spatial}$ with a temporal gradient magnitude energy $E_{temporal}$ to produce a spatio-temporal $L_1$-norm gradient magnitude energy $E_{global}$ according to $$E_{spatial}(i, j) = \max_{t=1}^{N}\left\{\left|\frac{\partial}{\partial x}I_t(i, j)\right| + \left|\frac{\partial}{\partial y}I_t(i, j)\right|\right\}$$

$$E_{temporal}(i, j) = \max_{t=1}^{N}\left\{\left|\frac{\partial}{\partial t}I_t(i, j)\right|\right\}$$

$$E_{global}(i, j) = \alpha \cdot E_{spatial} + (1 - \alpha)E_{temporal},$$

where $I_t(i,j)$ corresponds to a pixel, t represents time, and a parameter $\alpha \in [0, 1]$ balances spatial and temporal cost contributions.

9. The method of claim 1, wherein edge nodes in the grid graph are connected to other nodes by arcs having an infinite cost.

10. The method of claim 1 further comprising:
determining a plurality of seams; and
resizing the input image according to the plurality of seams.

11. The method of claim 1, wherein a total cost C of the cut is a sum of the cost of the arcs that are cut.

12. The method of claim 1, wherein the coordinates i and j of the pixels p in the seam increase monotonically in a selected direction of the seam and are directly adjacent according to $[p_{i,j} \rightarrow p_{i+1,j}]$, $[p_{i,j} \rightarrow p_{i,j+1}]$, or $[p_{i,j} \rightarrow p_{i+1,j+1}]$.

13. The method of claim 1, wherein the monotonicity and connectivity constraints, make the seams exactly one pixel wide and extend the seam continuously from one edge of the input image to a directly opposite edge of the input image.

14. The method of claim 1, further comprising:
constructing the grid graph on multiple resolutions from coarse to fine;
approximating the cut on the grid graph with the lowest resolution and then refining the cut at higher resolutions.

15. The method of claim 1, in which the pixels in the seam are removed from the input image to produce a smaller output image.

16. The method of claim 1, in which the pixels in the seam are duplicated in the input image to produce a larger output image.

17. The method of claim 1, further comprising minimizing a cost of the cut.

\* \* \* \* \*